US011516308B1

(12) United States Patent
Dubynskiy et al.

(10) Patent No.: US 11,516,308 B1
(45) Date of Patent: Nov. 29, 2022

(54) ADAPTIVE TELEMETRY SAMPLING

(71) Applicant: Microsoft Technology Licensing, LLC, Redmond, WA (US)

(72) Inventors: Sergiy Dubynskiy, Kenmore, WA (US); Tatiana Shubin, Redmond, WA (US); Sandipan Ganguly, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/544,594

(22) Filed: Dec. 7, 2021

(51) Int. Cl.
*H04L 67/5651* (2022.01)
*H04L 67/12* (2022.01)

(52) U.S. Cl.
CPC .......... *H04L 67/5651* (2022.05); *H04L 67/12* (2013.01)

(58) Field of Classification Search
CPC ............................ H04L 67/5651; H04L 67/12
See application file for complete search history.

(56) References Cited

U.S. PATENT DOCUMENTS

| | | | |
|---|---|---|---|
| 9,590,880 B2 | 3/2017 | Ashby et al. | |
| 11,397,422 B2* | 7/2022 | Cella | H04L 1/18 |
| 2019/0057006 A1* | 2/2019 | Boyapalle | G06F 11/3452 |
| 2020/0159607 A1* | 5/2020 | Piaseczny | G06F 11/3612 |
| 2020/0272552 A1* | 8/2020 | Markiewicz | G06F 11/3495 |

OTHER PUBLICATIONS

"Making Sampling Percentage Dynamically Adjust (Adaptive Smpling)", Retrieved From: https://github.com/Microsoft/ApplicationInsights-dotnet/issues/80, Oct. 21, 2015, 6 Pages.
"Application as Filed in U.S. Appl. No. 17/355,088", filed Jun. 22, 2021, 30 Pages.
Gailey, et al., "MonitorAzure Functions", Retrieved From: https://docs.microsoft.com/en-us/azure/azure-functions/functions-monitoring#configure-the-aggregator, Jul. 9, 2021, 8 Pages.
Mushkatin, Victor, "Optimize Telemetry with Application Insights", Retrieved From: https://docs.microsoft.com/en-us/archive/msdn-magazine/2017/may/devops-optimize-telemetry-with-application-insights, May 2017, 19 Pages.
Wren, et al., "Sampling in Application Insights", Retrieved From: https://docs.microsoft.com/en-us/azure/azure-monitor/app/sampling#adaptive-sampling, Oct. 26, 2021, 22 Pages.

* cited by examiner

*Primary Examiner* — Normin Abedin
(74) *Attorney, Agent, or Firm* — NovoTechIP International PLLC

(57) ABSTRACT

A data processing system implements adaptive telemetry sampling by obtaining first telemetry data from a plurality of telemetry data sources, analyzing the first telemetry data to identify a subset of telemetry data sources for which a reduced sampling rate may be implemented, determining a reduced sampling rate for each event type of the plurality of event types, selecting a subset of the event types for which the reduced sampling rate is to be applied, obtaining second telemetry data from the subset of telemetry data sources at the reduced sampling rate associated with each event type of the subset of event types, analyzing the second telemetry data to determine one or more estimated metric values for one or more metrics, and generating a report comprising the one or more estimated metric values and an estimated total cost saving based on an estimated cost saving associated with each event type.

20 Claims, 10 Drawing Sheets

Figure 5:
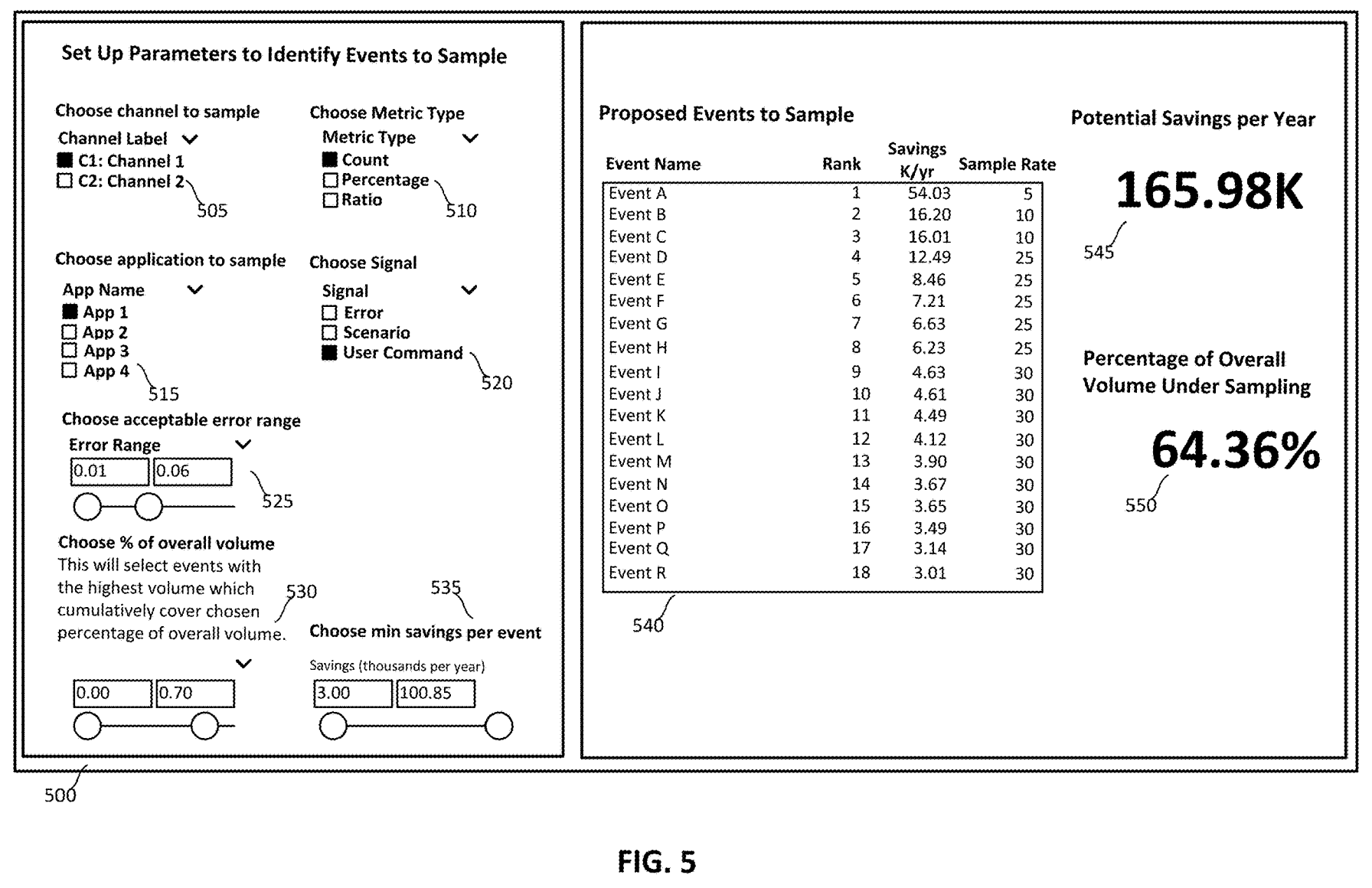

Set Up Parameters to Identify Events to Sample

Choose channel to sample
Channel Label ˅
■ C1: Channel 1
☐ C2: Channel 2
⤳505

Choose Metric Type
Metric Type ˅
■ Count
☐ Percentage
☐ Ratio
⤳510

Choose application to sample
App Name ˅
■ App 1
☐ App 2
☐ App 3
☐ App 4
⤳515

Choose Signal
Signal ˅
☐ Error
☐ Scenario
■ User Command
⤳520

Choose acceptable error range
Error Range ˅
| 0.01 | | 0.06 |
○━━━━○
⤳525

Choose % of overall volume
This will select events with the highest volume which cumulatively cover chosen percentage of overall volume.
˅
| 0.00 | | 0.70 |
○━━━━○
⤳530

Choose min savings per event
Savings (thousands per year)
| 3.00 | | 100.85 |
○━━━━○
⤳535

500⤴

Proposed Events to Sample

Potential Savings per Year
165.98K
⤳545

Percentage of Overall Volume Under Sampling
64.36%
⤳550

| Event Name | Rank | Savings K/yr | Sample Rate |
|---|---|---|---|
| Event A | 1 | 54.03 | 5 |
| Event B | 2 | 16.20 | 10 |
| Event C | 3 | 16.01 | 10 |
| Event D | 4 | 12.49 | 25 |
| Event E | 5 | 8.46 | 25 |
| Event F | 6 | 7.21 | 25 |
| Event G | 7 | 6.63 | 25 |
| Event H | 8 | 6.23 | 30 |
| Event I | 9 | 4.63 | 30 |
| Event J | 10 | 4.61 | 30 |
| Event K | 11 | 4.49 | 30 |
| Event L | 12 | 4.12 | 30 |
| Event M | 13 | 3.90 | 30 |
| Event N | 14 | 3.67 | 30 |
| Event O | 15 | 3.65 | 30 |
| Event P | 16 | 3.49 | 30 |
| Event Q | 17 | 3.14 | 30 |
| Event R | 18 | 3.01 | 30 |

ADAPTIVE TELEMETRY SAMPLING

BACKGROUND

Telemetry data is data generated by software that may be collected to improve customer experience. The telemetry data may be collected from software on a customer's computing device, from software executed on a cloud-based computing environment, or other systems on which the software has been deployed. The telemetry data may include information that may be analyzed to determine the security, health, quality, and performance of the software. The telemetry data may be used to assess user usage patterns, quality of software builds that have been deployed, identify issues with the deployed builds, and make release decisions for future builds to be deployed. Thus, the telemetry data collected may provide valuable insights into the software product and the usage patterns of the users of that software product. Consequently, the amount and types of telemetry data being collected continues to rapidly increase.

The proliferation of telemetry data has led to companies facing the problem of excessive telemetry data collection. The additional telemetry data increases costs related to networking, computing, and data storage. Additional network capacity is required to manage the increasing amounts of telemetry data being collected. Furthermore, additional computing resources and data storage resources are also required to process and store the additional telemetry data being collected. All these costs impact the cost of goods sold (COGS) of the software product. Companies must find a way to balance the costs associated with receiving and processing vast quantities of telemetry data with the benefits of the information obtained from analyzing this data. Hence, there is a need for improved systems and methods of deploying obtaining and analyzing telemetry data.

SUMMARY

An example data processing system according to the disclosure may include a processor and a machine-readable medium storing executable instructions. The instructions when executed cause the processor to perform operations including obtaining first telemetry data from a plurality of telemetry data sources; analyzing the first telemetry data to identify a subset of telemetry data sources of the plurality of telemetry data sources for which a reduced sampling rate may be implemented, the first telemetry data being associated with a plurality of event types; determining a reduced sampling rate for each event type of the plurality of event types, the reduced sampling rate indicating a percentage of the subset of telemetry data sources from which telemetry data associated with that event type is to be obtained; selecting a subset of the event types for which the reduced sampling rate is to be applied; obtaining second telemetry data from the subset of telemetry data sources at the reduced sampling rate associated with each event type of the subset of event types; analyzing the second telemetry data to determine one or more estimated metric values for one or more metrics, the one or more estimated metric values representing an estimate of what the one or more metric values would have been had the second telemetry data not been sampled at the reduced sampling rate; and generating a report comprising the one or more estimated metric values and an estimated total cost saving based on an estimated cost saving associated with each event type.

An example method implemented in a data processing system for adaptive telemetry sampling includes obtaining first telemetry data from a plurality of telemetry data sources; analyzing the first telemetry data to identify a subset of telemetry data sources of the plurality of telemetry data sources for which a reduced sampling rate may be implemented, the first telemetry data being associated with a plurality of event types; determining a reduced sampling rate for each event type of the plurality of event types, the reduced sampling rate indicating a percentage of the subset of telemetry data sources from which telemetry data associated with that event type is to be obtained; selecting a subset of the event types for which the reduced sampling rate is to be applied; obtaining second telemetry data from the subset of telemetry data sources at the reduced sampling rate associated with each event type of the subset of event types; analyzing the second telemetry data to determine one or more estimated metric values for one or more metrics, the one or more estimated metric values representing an estimate of what the one or more metric values would have been had the second telemetry data not been sampled at the reduced sampling rate; and generating a report comprising the one or more estimated metric values and an estimated total cost saving based on an estimated cost saving associated with each event type.

An example machine-readable medium on which are stored instructions. The instructions when executed cause a processor of a programmable device to perform operations of obtaining first telemetry data from a plurality of telemetry data sources; analyzing the first telemetry data to identify a subset of telemetry data sources of the plurality of telemetry data sources for which a reduced sampling rate may be implemented, the first telemetry data being associated with a plurality of event types; determining a reduced sampling rate for each event type of the plurality of event types, the reduced sampling rate indicating a percentage of the subset of telemetry data sources from which telemetry data associated with that event type is to be obtained; selecting a subset of the event types for which the reduced sampling rate is to be applied; obtaining second telemetry data from the subset of telemetry data sources at the reduced sampling rate associated with each event type of the subset of event types; analyzing the second telemetry data to determine one or more estimated metric values for one or more metrics, the one or more estimated metric values representing an estimate of what the one or more metric values would have been had the second telemetry data not been sampled at the reduced sampling rate; and generating a report comprising the one or more estimated metric values and an estimated total cost saving based on an estimated cost saving associated with each event type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 is a diagram of an example user interface for customizing the parameters used by the adaptive sampling framework.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for generating deployment policies for adaptive telemetry sampling are described. These techniques provide a technical solution to the problem of receiving and analyzing the massive amount of telemetry data that may be collected for a typical software product. The telemetry data may be used to assess feature usage patterns of the software product, to assess the quality of the builds of the software product and/or to identify issues with the builds, to make release decisions, and/or to make other critical decisions related to the software product. However, processing all this telemetry data consumes substantial amounts of network, computing, and storage resources, and the cost of supporting these resources is significant.

The techniques described herein provide means for automatically analyzing the telemetry data and identifying logical groups or slices of telemetry data that may be sampled at a reduced rate without hampering insights provided by the telemetry data. The telemetry data is automatically analyzed by a model trained to identify the telemetry data that may be sampled at a reduced rate without exceeding a guaranteed error margin, and to provide estimated cost savings that may be achieved by sampling the telemetry data at the reduced rate. An optimal sampling rate may be provided for each logical grouping of telemetry data. These techniques also provide a means for estimating what the metric values collected would have been had the full set of telemetry data been collected. Thus, significant cost savings may be achieved by reducing the network, computing, and storage resources required to obtain and analyze the telemetry data without negatively impacting the accuracy of the insights provided by the telemetry data. These and other technical benefits of the techniques disclosed herein will be evident from the discussion of the example implementations that follow.

Figure 1:
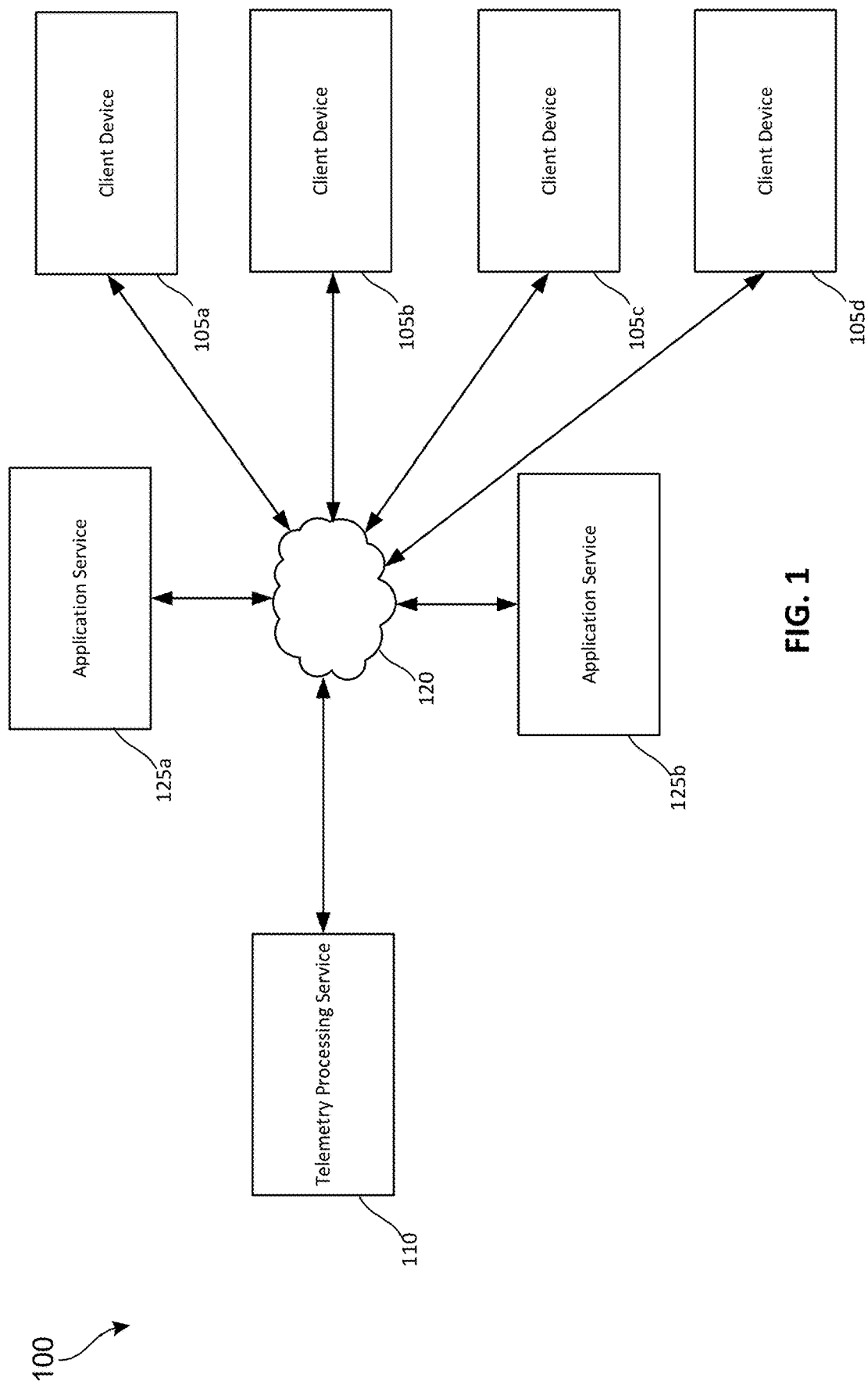
FIG. 1 is a diagram showing an example computing environment in which the techniques disclosed herein may be implemented.

FIG. 1 is a diagram showing an example computing environment 100 in which the improved techniques for obtaining and analyzing telemetry data may be implemented. The computing environment 100 may include a telemetry processing service 110 that implements the adaptive sampling techniques described herein. The example computing environment 100 may also include one or more client devices, such as the client devices 105a, 105b, 105c, and 105d. The client devices 105a, 105b, 105c, and 105d may communicate with the telemetry processing service 110 and/or the application services 125a and/or 125b (referred to collectively as application services 125) via the network 120. The cloud-based services 125a and 125b may also communication with the telemetry processing service 110 via the network 120. The network 120 may be a dedicated private network and/or the combination of public and private networks commonly referred to as the Internet.

In the example shown in FIG. 1, the telemetry processing service 110 is implemented as a cloud-based service or set of services. The telemetry processing service 110 is configured to receive telemetry data generated by the cloud-based services 125a and/or 125b and/or the client devices 105a, 105b, 105c, and 105d (referred to herein collectively as telemetry data sources). The telemetry processing service 110 may implement the adaptive telemetry sampling techniques described in detail in the examples which follow. The adaptive telemetry sampling techniques provide a means for selectively reducing the amount of telemetry data collected and analyzed by the telemetry processing service 110 while maintaining the accuracy of metrics determined from the telemetry data within a guaranteed error margin. The telemetry processing service 110 provides tools for intelligently predicting how adjusting the amount of telemetry data collected would impact metric precision and costs associated with the collection and processing of the telemetry data. The telemetry processing service 110 may be configured to automatically provide recommendations for realizing desired cost savings while maintaining a desired level of precision in the metrics. Additional details of the adaptive sampling techniques provided in the examples which follow.

The cloud-based services 125a and 125b may include, but are not limited to, applications for creating, consuming, and/or modifying content, file storage and management platforms, collaboration and communications platforms, and other types of software as a service. The cloud-based services 125a and 125b may include numerous servers, network devices, storage elements and other components to support the various services that are provided by the telemetry processing service 110. Furthermore, the telemetry processing service 110 may also include other hardware and software to support various processes and services that support and maintain the various components of the telemetry processing service 110. The cloud-based services 125a and 125b may be configured to generate various types of telemetry data that may be used to assess user usage patterns, the quality of software builds that have been deployed, to identify issues with the deployed builds, and to make release decisions for future builds to be deployed. The telemetry data may be sent to the telemetry processing service 110 via the network 120 for processing.

In some implementations, the functionality of the telemetry processing service 110 may be implemented at least in part by the cloud-based services 125*a* and 125*b*, and the telemetry data generated by the cloud-based services 125*a* and 125*b* may be collected by components of these services. Additional telemetry data may also be collected from one or more client devices, such as the client devices 105*a*, 105*b*, 105*c*, and 105*d*.

The client devices 105*a*, 105*b*, 105*c*, and 105*d* (referred to collectively as client device 105) are computing devices that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include a different number of client devices that may utilize the cloud-based services 125*a* and 125*b* and/or the telemetry processing service 110. Furthermore, in some implementations, some features of the services provided by the cloud-based services 125*a* and 125*b* may be implemented by a native application installed on the client device 105, and the native application may communicate with the cloud-based services 125*a* and 125*b* over a network connection to exchange data with cloud-based services 125*a* and 125*b* and/or to access features implemented on the cloud-based services 125*a* and 125*b*. The native application may generate various types of telemetry information that may be sent to the telemetry processing service 110 for collection and processing. In some implementations, the client device 105 may include a native application that is configured to communicate with the telemetry processing service 110 to provide visualization and/or reporting functionality.

Figure 2:
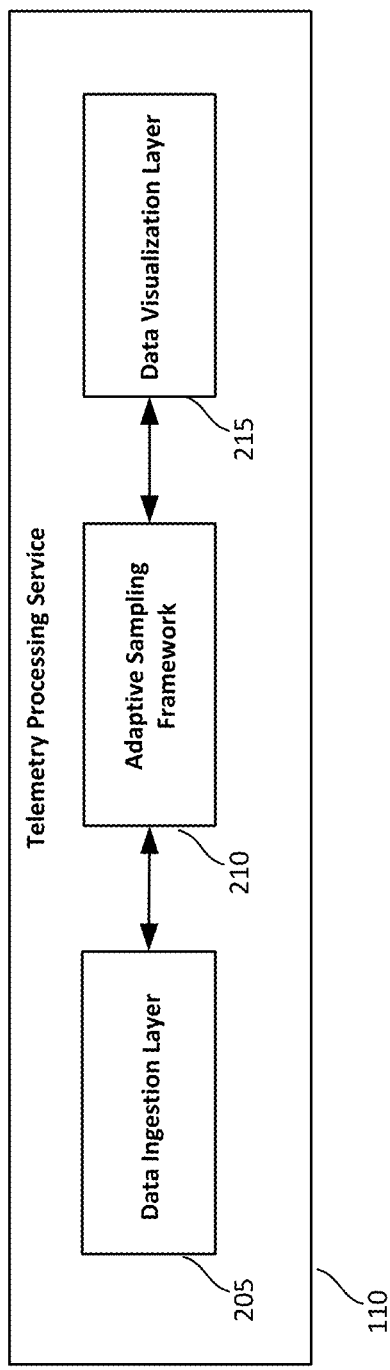
FIG. 2 is a diagram of an example implementation of the telemetry processing service 110.

FIG. 2 is a diagram of an example implementation of the telemetry processing service 110. The telemetry processing service 110 may include a data ingestion layer 205, an adaptive sampling framework 210, and a data visualization layer 215.

The data ingestion layer 205 may be configured to receive telemetry data from telemetry data sources, including but not limited to the cloud-based services 125*a* and 125*b* and/or the client devices 105*a*, 105*b*, 105*c*, and 105*d*. The data ingestion layer 205 may be configured to store the received telemetry data and perform aggregation and/or other preprocessing on the telemetry data before providing the preprocessed telemetry data to the adaptive sampling framework 210.

The adaptive sampling framework 210 is a data processing layer of the telemetry processing service 110. The adaptive sampling framework 210 may be configured to implement the adaptive sampling techniques provided herein. The adaptive sampling framework 210 may be configured to analyze the data that has been aggregated and/or preprocessed by the data ingestion layer 205. The adaptive sampling framework 210 may be configured to query a telemetry database populated by the data ingestion layer 205 to obtain the telemetry data to be analyzed. The adaptive sampling framework 210 may implement various models configured to: (1) identify specific audiences and/or domains associated with logical groupings of telemetry data (also referred to herein as "slices" of the telemetry data) for which adaptive sampling may be implemented, (2) determine an optimal sampling rate for telemetry data associated with each event type included in the telemetry data for each slice while maintaining an error rate associated within a guaranteed error margin, and (3) estimate savings related to operating costs resulting from implementing the optimal sampling rates. The adaptive sampling framework 210 may also be configured to estimate various metric values derived from the telemetry data. These metrics may be used to generate reports that may be used for making critical business decisions regarding software applications for which the telemetry data has been collected. The values of these metrics may be significantly skewed if calculated based on the reduced telemetry data resulting from adaptive sampling. However, the adaptive sampling framework 210 can estimate what the metric values should have been had adaptive sampling not been used and one hundred percent of the telemetry data available was provided by the telemetry data sources. The adaptive sampling framework 210 may be configured to infer an estimated value for each of these metrics based on the known sampling rate and the telemetry data received while adaptive sampling was being used. These estimated metric values account for the reduction of telemetry data associated with adaptive sampling and may be used for reporting and analysis.

The data visualization layer 215 provides a means for viewing the adaptive sampling rate and cost estimate data generated by the adaptive sampling framework 210. The data visualization layer may also provide a means for monitoring estimates of various metrics recovered from the telemetry data obtained using adaptive sampling. The data visualization layer 215 may be implemented using a variety of existing visualization tools and/or visualization libraries. The adaptive sampling framework 210 may provide an application programming interface (API) that the data visualization layer 215 may utilize to provide users with a means for interacting with the adaptive sampling framework 210. In some implementations, the data visualization layer 215 may be implemented using Microsoft Power BI. Other tools may be used to implement the data visualization layer 215. Alternatively, the data visualization layer 215 may be implemented as a website or web application that is configured to utilized one or more visualization libraries to provide a user interface for interacting with the adaptive sampling framework 210.

Figure 3:
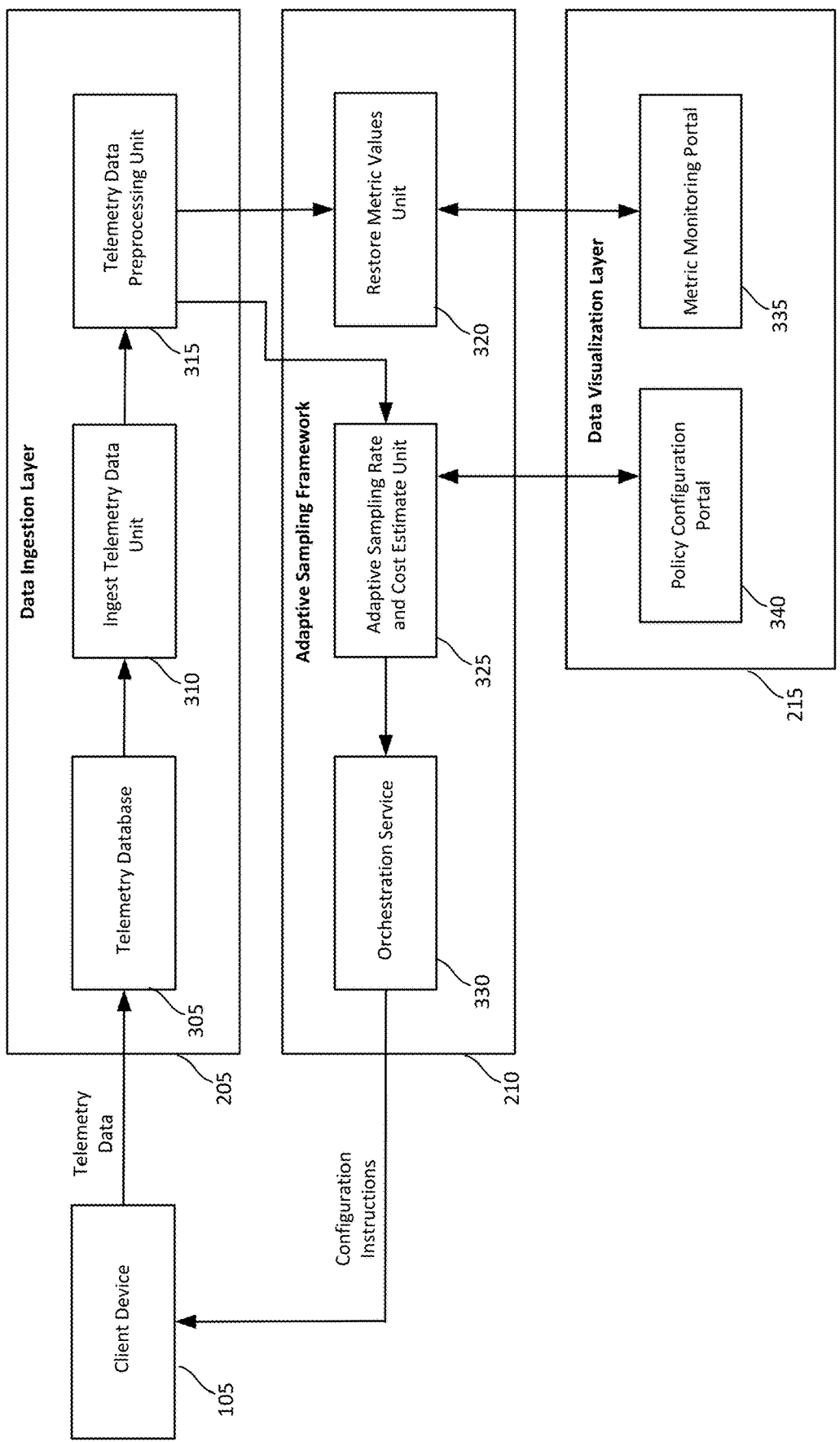
FIG. 3 is a diagram of another example implementation of the telemetry processing service that shows additional details

FIG. 3 is a diagram of another example implementation of the telemetry processing service 110 that shows additional details of the data ingestion layer 205, the adaptive sampling framework 210, and the data visualization layer 215.

The data ingestion layer 205 may be configured to receive telemetry data generated by various telemetry data sources. The telemetry processing service 110 may be configured to receive telemetry data associated with various types of events associated with one or more software products operating on the telemetry data sources. The telemetry data may include information that may be used to assess user usage patterns, the quality of software builds that have been deployed, to identify issues with the deployed builds, to make release decisions for future builds to be deployed, and other information regarding the performance of the software builds that have been deployed for client use.

The data ingestion layer 205 may store the received telemetry data in a telemetry database 305. The data ingestion layer 205 may store the telemetry data in a format received by the telemetry processing service 110 or may be configured to reformat the telemetry data to another format for storage in the telemetry database 305. The data ingestion layer 205 may be configured to reformat the various types of telemetry data received by the telemetry processing service 110 to a standard format to facilitate processing and analysis of the telemetry data.

The telemetry database 305 may be implemented using the Microsoft Azure Cosmos DB to implement the telemetry database 305. Extremely high volumes of telemetry data may be received by the telemetry processing service 110 at irregular intervals. The Cosmos DB provides automatic scaling of throughput for implementations that have unpredictable traffic and high-performance requirements. Other implementations may be implemented by other types of databases.

The ingest telemetry data unit 310 may be configured to query data from the telemetry database 305. The ingest telemetry data unit 310 may be configured to aggregate and/or otherwise reduce the amount of data obtained from the telemetry database 305. The telemetry data associated with a particular event may be aggregated by time period. For example, the event data may be aggregated by hour, day, week, month, quarter, or other time period. The particular time period selected may be based at least in part on the amount of telemetry data associated with the particular event and/or a level of granularity that is desired when analyzing the event data. For example, the event data may be aggregated by hour so that usage patterns throughout the day may be analyzed. The telemetry data may be aggregated by geographical areas of interest. The telemetry data associated with a particular event may be aggregated by state, province, country, region, or other geographical area. The telemetry data may be aggregated by both geographical areas of interest and the time period to facilitate analysis of the telemetry data over time for each geographical area of interest. Other criteria for aggregating the telemetry data may be used instead of or in addition to these criteria. The aggregated data may be provided to the telemetry data preprocessing unit 315. The aggregated data may also be stored in a persistent datastore (not shown) that may facilitate further analysis of the telemetry data.

The telemetry data preprocessing unit 315 may be configured to preprocess the data obtained by the ingest telemetry data unit 310. The telemetry data preprocessing unit 315 may be configured to process the data output by the ingest telemetry data unit 310 to format the data into one or more formats that may be utilized by the adaptive sampling framework 210. For example, the telemetry data preprocessing unit 315 may be configured to output data in a format that is expected by the adaptive sampling rate and cost estimate unit 325 and/or the restore metric values unit 320 implemented by the adaptive sampling framework 210.

The adaptive sampling framework 210 includes a restore metric values unit 320, an adaptive sampling rate and cost estimate unit 325, and an orchestration service 330. The adaptive sampling rate and cost estimate unit 325 may implement various machine learning models trained to: (1) identify specific audiences and/or domains associated with logical groupings of telemetry data (also referred to herein as "slices" of the telemetry data) for which adaptive sampling may be implemented, (2) determine an optimal sampling rate for telemetry data associated with each event type included in the telemetry data for each slice while maintaining an error rate associated within a guaranteed error margin, and (3) estimate savings related to operating costs resulting from implementing the optimal sampling rates. The adaptive sampling rates recommended by the adaptive sampling rate and cost estimate unit 325 may significantly reduce the amount of telemetry data obtained and processed for specified telemetry signals while ensuring that the error rate remains within the guaranteed error margin. The collection and analysis of telemetry data associated with selected telemetry signals may be reduced but the data that is collected is representative of the population from which the telemetry data is being collected. Therefore, the adaptive sampling framework 210 can infer what the values of metrics would have been had all the available telemetry data been sampled rather than sampling a subset of the data identified by the adaptive sampling rate and cost estimate unit 325. Additional details of how these calculations may be performed are described in the examples which follow.

The adaptive sampling rate and cost estimate unit 325 may analyze the telemetry data that is received and determine how adaptive sampling may impact the error rate associated with that sampling rate by running a series of simulations. Prior to adaptive sampling implementation, it can be assumed that one hundred percent of the telemetry data is received by the telemetry processing service 110. The adaptive sampling rate and cost estimate unit 325 can run a series of simulations to evaluate what the impact of sampling the telemetry data at different sampling rates would have on the error rate associated with the metrics obtained from the telemetry data. For example, the adaptive sampling rate and cost estimate unit 325 may run simulations to determine how sampling at 5%, 10%, 15%, and 20% rates may impact the error rate and estimated cost savings. The simulations may be run multiple times for each sample size with different samples drawn from the telemetry data. Drawing multiple samples at each of the sampling rates may be used to determine the variability of metric values based on the telemetry data and the variability of the estimated error associated with the metric value. The adaptive sampling rate and cost estimate unit 325 may discard simulation results in which the estimated error associated with the metrics exceeds the guaranteed error margin.

Figure 10:
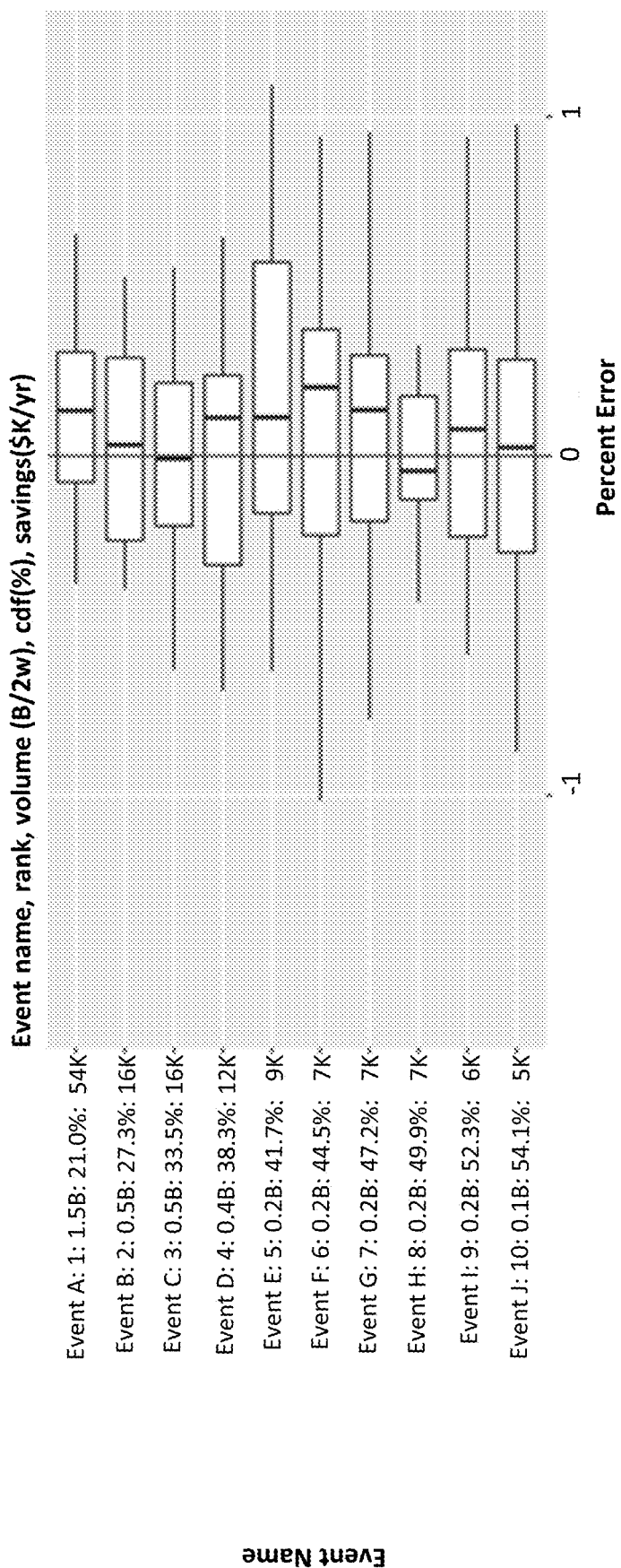
FIG. 10 is a diagram showing an example of simulation results for a set of telemetry signals.

FIG. 10 is a diagram that shows an example of simulation results that may be generated through simulation performed by the adaptive sampling rate and cost estimate unit 325. The example simulation results shown in FIG. 10 are for a set of ten telemetry signals associated with particular events that generate telemetry data. The telemetry data analyzed in this example is associated with a particular slice of telemetry data. The simulation results have been generated for a specific adaptive sampling rate and represent an estimated financial savings that may be achieved by implementing the adaptive sampling at this rate for the specified events. The simulation results are represented as a boxplot of the types of events represented in the simulation results (vertical axis) and the estimated percent error (horizontal axis) for the respective event. The information included for each event includes the event name, a rank associated with the event, the volume of telemetry data associated with the event (in billions of telemetry data received over two-week period), cumulative distribution percentage associated the event, and an estimated savings per year in thousands.

The first entry is for the first event type "Event A" which represents 21% of the cumulative telemetry data volume received over the two-week period analyzed in the simulation. The first event type is associated with a volume of 1.5 billion events over the two-week period represented by the simulation results. The simulation results indicate that a savings of $54,000 may be achieved by applying the adaptive sampling at the specified rate to telemetry data of the first event type. The savings may be determined by models trained to estimate the costs savings that may be achieved based on the reduction in network traffic, computational resources, and/or storage resources that may result from the implementation of the adaptive sampling.

The second entry is for a second event type "Event B" which represents 6.3% of the telemetry data volume. The second entry shows a cumulative percentage of 27.% of the cumulative telemetry data volume is represented by the first and second event types. The second event type is associated with a volume of 0.5 billion events for the two-week period represented by the simulation results. The simulation results indicate that a savings of $16,000 may be achieved by applying the adaptive sampling at the specified rate to the telemetry data of the second event type.

Figure 4:
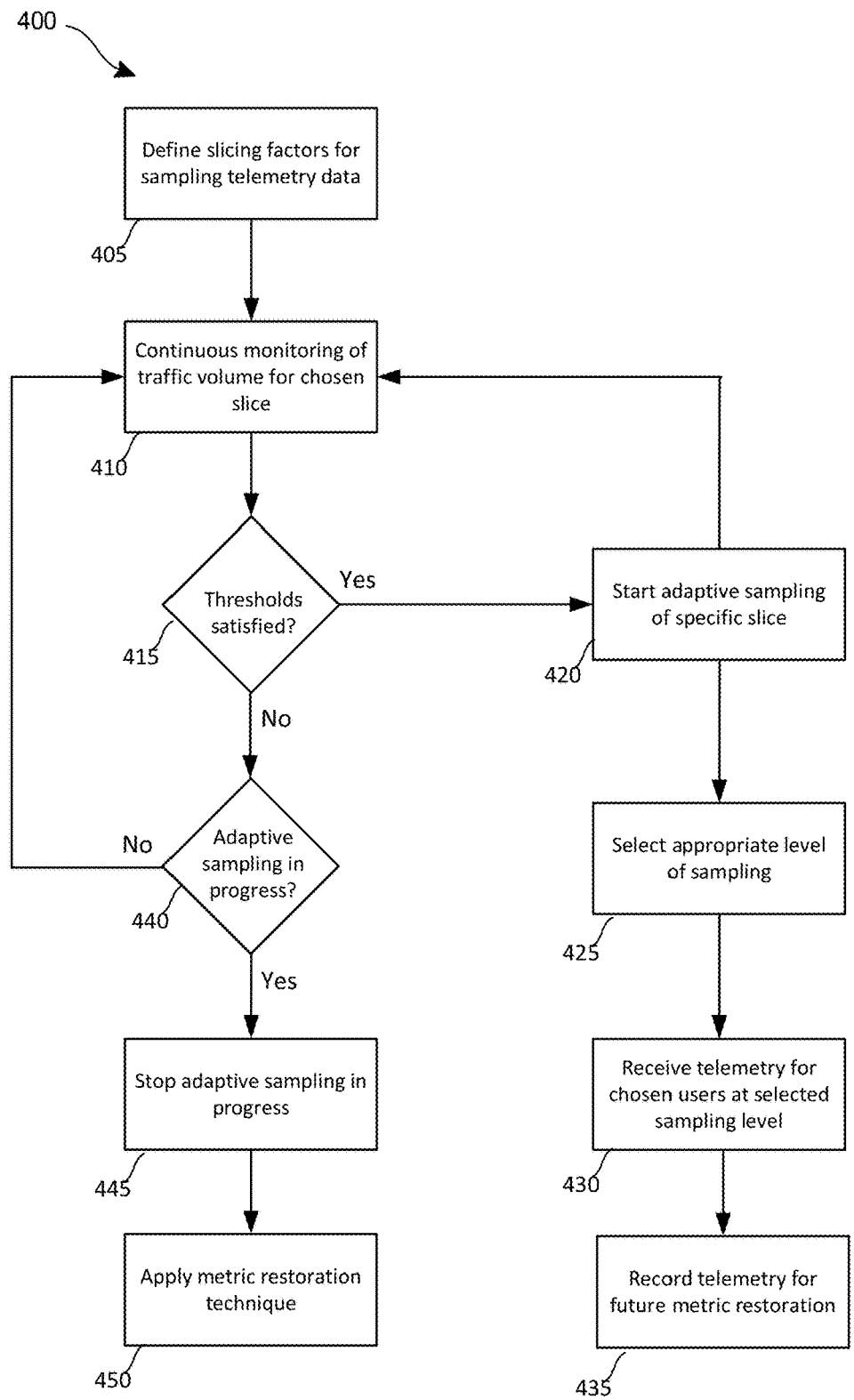
FIG. 4 is a flow diagram of a process for performing adaptive sampling techniques.

The ten events identified in this example account for 54.1% of the cumulative telemetry data volume for the two-week period. Implementing the adaptive sampling techniques may result in savings of $135,000 based on sum the estimated savings associated with each of the events. While the example shown in FIG. 10 includes ten events, other simulations may select a different number of events based on the parameters configured by the user using the user interface 500 shown in FIG. 5. The user may set limits on the adaptive sampling, including defining a guaranteed error margin. The guaranteed error margin represents a range indicating how far the estimated telemetry values may be from the actual telemetry value associated with the telemetry signal. The actual telemetry value represents the value that would have been determined for a particular metric had all the telemetry data associated with that telemetry signal been collected and analyzed. Additional details of the adaptive sampling techniques that may be performed by the adaptive sampling rate and cost estimate unit 325 are shown in FIG. 4.

The guaranteed error margin utilized by the adaptive sampling rate and cost estimate unit 325 may be configured by a user via a user interface, such as the user interface 500 shown in FIG. 5. The user interface enables a user to configure the guaranteed error margin and other parameters that may be used by the adaptive sampling framework 210 to balance accuracy of the metrics obtained by analyzing the telemetry data with the cost savings that may be attained by reducing the sampling rates of various telemetry signals.

The orchestration service 330 may be configured to receive configuration information from the adaptive sampling rate and cost estimate unit 325. The configuration information may provide an indication of a percentage of the telemetry data associated with a particular telemetry signal to be collected. The orchestration service 330 may be configured to send commands to a subset of the telemetry data sources, such as the client devices 105a, 105b, 105c, and 105d and the cloud-based services 125a and 125b, to instruct the telemetry data sources to stop at least temporarily sending specified telemetry data or to start sending specified telemetry data. The orchestration service 330 may be configured to select telemetry data sources to stop sending telemetry data for a particular telemetry signal in response to configuration information from the adaptive sampling rate and cost estimate unit 325 that indicates that the number of samples for that telemetry signal should be decreased below the current sampling rate. The orchestration service 330 may be configured to select telemetry data sources to start sending telemetry data for a particular telemetry signal in response to configuration information from the adaptive sampling rate and cost estimate unit 325 that indicates that the number of samples for that telemetry signal should be increased above the current sampling rate. The orchestration service 330 may send commands to the telemetry data sources to dynamically increase or decrease the sampling rate based on configuration information provided by the adaptive sampling rate and cost estimate unit 325.

The restore metric values unit 320 is configured to analyze telemetry data provided by the telemetry data preprocessing unit 315. The restore metric values unit 320 may be configured to determine an estimate of the actual telemetry value that would have been obtained had all the telemetry data associated with that telemetry signal been collected and analyzed. The adaptive sampling techniques implemented by the adaptive sampling rate and cost estimate unit 325 may result in a reduction in the telemetry data received and analyzed. As a result, the metrics produced by the telemetry data received while adaptive sampling is being used may be significantly lower than the number of events that would have otherwise been received had active sampling not been implemented. However, the restore metric values unit 320 estimates what these metrics would have been had all of the telemetry data been sampled for a particular telemetry signal.

Figure 6:
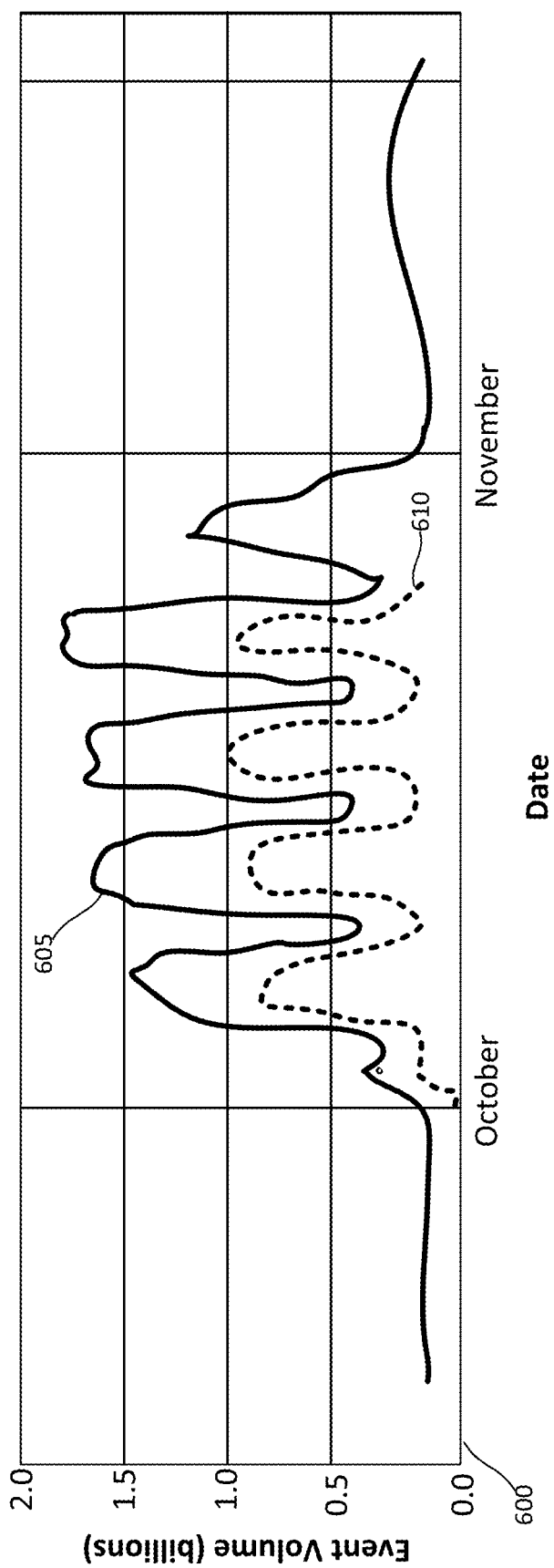
FIG. 6 is a graph that shows an example reduction in telemetry data associated with the use of the adaptive sampling techniques.

FIG. 6 is a graph 600 that shows an example reduction in telemetry data associated with the use of the adaptive sampling techniques. The horizontal or x-axis of the graph represents the time, and the vertical or y-axis represents the volume of telemetry data received in billions. The solid line 605 represents the amount of telemetry data associated with a particular telemetry signal that would have been received had the adaptive sampling techniques not been used to reduce the amount of telemetry data received. The dotted line 610 represents the amount of telemetry data received while the adaptive sampling techniques were being utilized. As can be seen from the graph 600, the adaptive sampling techniques provide a significant reduction in the amount of telemetry data received and analyzed, thereby significantly reducing the network, computing, and storage resources consumed.

The telemetry data received may be analyzed and used to generate various metrics representing how various features of the software product are being used by users and/or for identifying problems with the software product. These metrics may be used for reporting purposes and may be used to make critical business decisions regarding the software product. However, the reduced amount of telemetry data received while using adaptive sampling may significantly skew these metrics. To address this problem, the restore metric values unit 320 may be configured to estimate what the metrics would have been had the adaptive sampling techniques not been applied. The sampling rate at which the telemetry data was obtained is known and can be used to determine an estimate of what the telemetry metrics would have had no adaptive sampling been performed. For example, if the sampling rate associated the telemetry signal referenced in FIG. 6 was 50%, the actual amount of telemetry data that would have been received without the use of adaptive sampling can be estimated by doubling the amounts of telemetry data received. Thus, the value at a point on the dotted line 610 may be doubled to obtain an estimate of the corresponding point on the solid line 605. Different telemetry signals may have different sampling rates, and the restore metric values unit 320 may take this into account when estimating the metrics associated with these telemetry signals. For example, a first telemetry signal may have a 5% sampling rate, a second telemetry signal may have a 15% sampling rate, and a third telemetry signal may have an 80% sampling rate. The restore metric values unit 320 calculates an estimate of what the metrics associated with these telemetry signals would have been had there been a 100% sampling rate.

Returning to FIG. 3, the data visualization layer 215 may include a policy configuration portal 340 and a metric monitoring portal 335. The policy configuration portal 340 may implement a user interface, such as the user interface 500 shown in FIG. 5, for configuring the various parameters that may be used by the adaptive sampling rate and cost estimate unit 325 to generate adaptive sampling recommendations. The metric monitoring portal 335 may provide a means for users to view estimates of the estimated generated by the restore metric values unit 320. The metric monitoring portal 335 may provide a means for generating various reports that present the estimated metrics to the users. These reports may provide an analysis of the estimated metrics to provide insights into various aspects of a software product, such as but not limited to usage patterns of the software product, the quality of the builds of the software product and/or to issues with the builds, and/or other information related to the performance and/or usage of the software product that may be used to make critical business decisions regarding the software product.

FIG. 4 is a flow diagram of a process 400 for performing adaptive sampling techniques. The process 400 may be implemented by the adaptive sampling framework 210 of the telemetry processing service 110. The process 400 may be used to selectively switch on and off the adaptive sampling of telemetry data of one or more telemetry signals.

The process 400 may include an operation 405 of defining slicing factors for sampling telemetry data. A "slice," as used herein, refers to a specific audience or domain for which telemetry data should be sampled. Each slice may be defined by a set of slicing factors that determine how the telemetry data associated with one or more telemetry signals should be collected. The slicing factors may include but are not limited to telemetry data associated with a particular application, platform, language, list of telemetry signals, and/or other such factors that may be used to define a specific group of users from which telemetry data is to be collected and for which adaptive sampling may be applied.

The slicing factors may be determined by: (1) running a series of simulations that may provide optimal sampling rates for various slicing factors and constructing a list of telemetry signals for which adaptive sampling may be performed, and (2) based on user inputs configuring one or more of the slicing parameters. The adaptive sampling framework 210 of the telemetry processing service 110 may be configured to present the list of telemetry signals for which adaptive sampling is recommended to a user and permit the user to adjust these parameters. The example user interface 500 shown in FIG. 5 provides an example of such a user interface. The user may initially be presented with recommendations for adaptive sampling based on the simulations conducted on the telemetry data collected by the telemetry processing service 110. The user may change one or more of the slicing parameters via the user interface 500, and the adaptive sampling rate and cost estimate unit 325 may determine a revised adaptive sampling recommendation based on these changes to the slicing parameters. The slicing factors recommended by the adaptive sampling rate and cost estimate unit 325 may be based on logical groupings of data where there is a large amount of telemetry data available.

To illustrate these concepts, assume that the United States is a market for one of the software products for which telemetry data is collected. The user base in the United State may include several hundred million users from which telemetry data for the application may be collected. The Republic of Malta is another market for the software product. The population of Malta is significantly smaller, and the userbase located in Malta may include a few hundred thousand users from which telemetry data from the application may be collected. Due to the significantly higher volume of telemetry data received from the computing devices of users located in the United States, the sampling rate may be higher for these users without significantly increasing the error rate associated with the metrics obtained from the telemetry data. For example, the sampling rate may be set to 15% for the United States, indicating that 15% of the telemetry data is sampled due the high volume of telemetry data. However, adaptive sampling may not be implemented at all for the telemetry data obtained from Malta, due to the significantly smaller volume of telemetry data obtained from Malta. The adaptive sampling may not be applied to smaller markets or audiences, because the error rates associated with smaller markets may exceed the guaranteed error margins and/or result in loss of data that may provide valuable insights into these smaller markets or audience.

To illustrate these concepts, assume that Microsoft publishes multiple applications and periodically publishes updates to these applications. Based on analysis of telemetry data obtained from these applications, the adaptive sampling rate and cost estimate unit 325 may perform a series of simulations on the telemetry data to determine that a substantial cost savings may be achieved with limited degradation in metric position may be obtained by implementing adaptive sampling. For example, the adaptive sampling rate and cost estimate unit 325 may determine that a limited degradation of the metric precision is achievable by applying adaptive sampling only to: (1) the latest version of each of several specified applications on the Microsoft Windows 32-bit (Win32) platform, (2) for the United States region, and (3) scope is the most costly events. In this example case, the slicing factors are: application={Word, Excel, PowerPoint}; application_version="latest build"; country="US"; event_name={most costly events}. The "most costly events" factor refers to a subset of events that are estimated to consume the most network, computing, and/or storage resources and may provide the greatest cost savings. Only telemetry data for events that satisfy the conditions set by the slicing factors will be subject to the adaptive sampling.

The process 400 may include an operation 410 of continuously monitoring of traffic volume for a chosen slice. The telemetry processing service 110 continuously monitors the telemetry data traffic received from the telemetry data sources. The adaptive sampling of the telemetry data for a particular slice may be automatically started and stopped based on certain conditions being satisfied. The triggering conditions for automatically starting and stopping adaptive sampling may be based on: (1) predefined metrics based on business requirements, and (2) threshold accuracy for estimation of the metrics. The predefined metrics may include but are not limited to daily and/or cumulative counts of sessions, users, device, and/or events associated with the telemetry data received for the chosen slice. For example, the triggering conditions may indicate that adaptive sampling may be triggered if the latest software build has spent a least X days in product, has been deployed to Y devices, and accumulated at least Z usages sessions either cumulatively on all Y devices or per device, where X, Y, and Z are positive integer values. The simulations may determine that if the volume of events represented by X, Y, and Z are met, then the threshold accuracy can also be satisfied. For example, the threshold accuracy may be P % accuracy. The telemetry processing service 110 may trigger the adaptive sampling techniques in response to the predefined metrics being satisfied and the simulations indicating that the threshold accuracy may also be met.

The process 400 may include an operation 415 of determining whether the thresholds for initiating adaptive sampling have been satisfied. If so, the process may continue to operation 420. Otherwise, the process may continue with operation 440.

The process 400 may include an operation 440 of determining whether adaptive sampling is in progress for the slice. The process 440 may continue with the operation 440 in response to a determination that the conditions for performing adaptive sampling are no longer met. The volume to telemetry events may fall below a volume in which the threshold accuracy percentage P may be achieved. For example, as users migrate from a first version of the software product to a second version of the software product, the amount of telemetry data associated with the first version of the software product may fall below the threshold amount of telemetry data indicated by the simulations required to provide an accurate representation of the metrics. The process 400 may return to operation 410 if adaptive sampling was not currently in progress for the respective slice. Otherwise, the process 400 may proceed to operation 445.

The process 400 may include an operation 445 of stopping adaptive sampling that was in progress for the slice. The adaptive sampling may be stopped for the respective slice of telemetry data. However, if the volume of telemetry data were to subsequently increase such that the triggering conditions are satisfied, the adaptive sampling for the respective slice of telemetry data may be restarted.

The process 400 may include an operation 450 of applying metric restoration techniques. The restore metric values unit 320 may be configured to estimate what the metrics would have been had the adaptive sampling techniques not been applied. These values may be used for reporting purposes as discussed in the preceding examples.

The process 400 may include an operation 420 of starting adaptive sampling of the specific slice. The orchestration service 330 of the telemetry processing service 110 may send message to the telemetry data sources to selectively enable or disable the telemetry data being generated and send by those data sources.

The process 425 may include an operation 425 of selecting an appropriate level of sampling for the specific slice. The appropriate level of sampling may be determined based on the simulations performed by the adaptive sampling rate and cost estimate unit 325. The level of sampling may be based on the desired threshold accuracy for the metrics derived from the telemetry data. The user may specify a desired accuracy range using the user interface 500 shown in FIG. 5.

The process 430 may include an operation 430 of receiving telemetry for the chosen users at selected sampling level. The telemetry sources may transmit the telemetry data to the telemetry processing service 110. The data ingestion layer 205 of the telemetry processing service 110 receives the telemetry data from the various telemetry data sources.

The process 435 may include an operation 435 of recording telemetry for future metric restoration. The telemetry data that is received may be processed by the restore metric values unit 320 for later estimation of what the metric values would have been had 100% of the telemetry data been collected rather than utilizing adaptive sampling to reduce the volume of telemetry data received from the telemetry data sources.

FIG. 5 is a diagram of an example user interface 500 for customizing the parameters used by the adaptive sampling framework 210. The user interface 500 may also provide a visualization of the potential cost savings that may be achieved by implementing the adaptive sampling technique using the parameters selected on the user interface 500. The user interface 500 may be presented on a display of the client device 105 of an administrator, such as an administrator of the cloud-based service 125a or 125b. The user interface may be presented by a native application on the client device 105 and/or may be accessed using a web browser on the client device 105.

The left side of the user interface 500 includes a set of controls for setting various parameters associated with the adaptive sampling. The example controls shown in FIG. 5 show one possible set of controls that may be provided to a user of the telemetry processing service 110. Other configurations may include other controls in additional to and/or instead of one or more of the controls shown in the example implementation of FIG. 5.

The channel control 505 allows the user to select a particular channel of telemetry data. The telemetry data received may be subdivided into multiple logical channels. The user may select a channel to limit the adaptive sampling to telemetry data associated with that particular channel. The metric type control 510 allows the user to select the types of metric or metrics to be included in the adaptive sampling. The application control 515 allows the user to select one or more applications for which the adaptive sampling would be applied. The signal type control 520 allows the user to select one or more types of telemetry signal to be included in the adaptive sampling.

The error range control 525 allows the user to set an upper and/or lower value for acceptable error range. As discussed in the preceding examples, the adaptive sampling rate and cost estimate unit 325 may utilize the error range to provide a guaranteed error margin that falls within this range. The adaptive sampling rate and cost estimate unit 325 may run multiple simulations on the telemetry data using different sampling rates to how low a percentage of the telemetry data may be collected and still provide an estimated error rate that falls within the error range specified by the user.

The percentage of overall volume control 530 allows the user to specify how much of the cumulative volume of the telemetry data to be analyzed for possible adaptive sampling. For example, the use may specify that that between 30 to 40 percent and the telemetry processing service 110 may provide recommendations for events associated with telemetry data associated that are associated with 30 to 40 percent of the cumulative volume. The user may provide an upper and lower value that specifies a range of volumes.

The minimum savings per event control 535 allows the user to set a minimum estimated savings for a particular event. The user may minimum threshold for the amount of savings that may be achieved by implementing adaptive sampling for that type of telemetry signal. The user may set a range of minimum values. The adaptive sampling may achieve different saving amounts for different types of events, based on the volume of telemetry data associated with these events.

The right side of the user interface 500 provides a set of proposed events 540 for which adaptive sampling may be implemented, potential savings per year 545, and percentage of overall volume 550 that would be subject to the adaptive sampling. The set of proposed events 540 may be dynamically generated based on the parameters entered by the user using the control on the left side of the user interface 500. The proposed events 540 may be determined by the adaptive sampling rate and cost estimate unit 325 running simulations on the telemetry data that has already been received by the telemetry processing service 110. The set of proposed events 540 may be ranked based on the estimated savings per year that may be achieved by implementing the adaptive sampling rate shown. The sampling rate represents a percentage of the total telemetry data available for sampling from the telemetry data sources.

The potential savings per year 545 provides a representation of the estimated cost savings that can be achieved by implementing adaptive sampling according to the configuration shown in the user interface 500. In the example shown in FIG. 5, the estimated savings are presented as annual savings, but the user interface 500 may include controls that allow the user to customize the savings period. For example, the user may configure the results to be displayed in quarterly savings, monthly savings, or another period. The savings associated with each of the set of proposed events 540 may be dynamically updated to reflect the period selected by the user.

The percentage of overall volume 550 represents how much of a reduction in telemetry data would be achieved by implementing adaptive sampling using the configuration currently shown in the user interface 500. The percentage reduction represents the reduction in volume in telemetry data collected and analyzed if adaptive sampling is enabled relative to the volume of telemetry data that would be collected if all of the telemetry data were to be generated by the telemetry data sources without the use of adaptive sampling.

Figure 7:
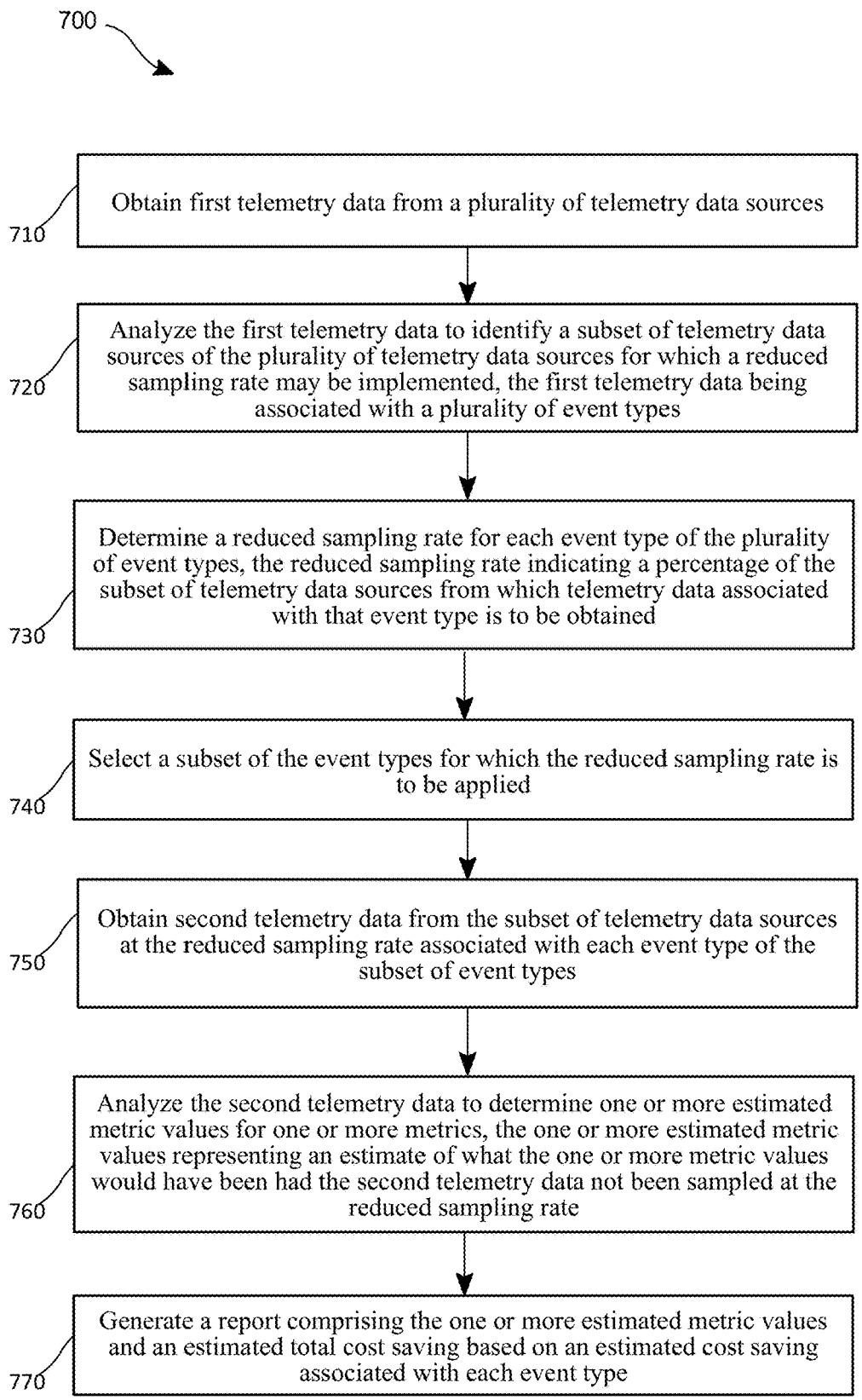
FIG. 7 is a flow chart of an example process for adaptive telemetry sampling.

FIG. 7 is a flow chart of an example process 700 for adaptive telemetry sampling. The process 700 may be implemented by the telemetry processing service 110. The process 700 may be used to implement the adaptive telemetry sampling techniques described herein.

The process 700 may include an operation 710 of obtaining first telemetry data from a plurality of telemetry data source. As discussed above, the telemetry data sources may include the client devices 105 of a plurality of users of one or more software products. The application services 125 may also be telemetry data sources. Some software products may be implemented as cloud-based applications, and the telemetry data may be generated by elements of the cloud-based environment that supports the cloud-based applications. The telemetry data may be received by the telemetry processing service 110 and ingested by the data ingestion layer 205.

The process 700 may include an operation 720 of analyzing the first telemetry data to identify a subset of telemetry data sources of the plurality of telemetry data sources for which a reduced sampling rate may be implemented. The first telemetry data is associated with a plurality of event types. The adaptive sampling framework 210 of the telemetry processing service 110 may run simulations on the first telemetry data. The first telemetry data is obtained before adaptive sampling is applied and should represent 100% of the telemetry data that would typically be received by the telemetry processing service 110. The adaptive sampling framework 210 may run a series of simulations to identify a "slice" or group of telemetry data sources for which the adaptive sampling techniques may be applied to reduce the volume of telemetry data to be processed by the telemetry processing service 110.

The process 700 may include an operation 730 of determining a reduced sampling rate for each event type of the plurality of event types. The simulations performed by the adaptive sampling framework 210 may also provide a reduced sampling rate for each type of telemetry data event. The reduced sampling rate indicates a percentage of the subset of telemetry data sources from which telemetry data associated with that event type is to be obtained. Each type of event may be sampled at a different rate so that the error rate associated with the metrics derived from telemetry data of that event type do not exceed the guaranteed error margin.

The process 700 may include an operation 740 of selecting a subset of the event types for which the reduced sampling rate is to be applied. The subset of event types may be selected based on parameters set by a user via the user interface 500 shown in FIG. 5. The user may set a minimum savings amount, a minimum reduction in the overall telemetry volume, and/or a maximum error rate associated with the event type. The minimum savings amount indicates a minimum savings threshold that may be achieved by applying adaptive sampling to the telemetry data of the specified event type. Some event types may be associated with a small amount of telemetry data, and the user may wish to disable adaptive sampling for such event types so that all the available telemetry data associated with that event type may be obtained and analyzed. The maximum error rate indicates a guaranteed error margin. The error rates associated with the reduction in telemetry volume and/or cost savings associated with each event type determined by the telemetry processing service 110 may not exceed the maximum error rate.

The minimum reduction in overall telemetry volume represents a minimum threshold that must be satisfied for adaptive sampling to be initiated. The minimum reduction in overall telemetry volume represents the sum of the reduction in telemetry data volume associated with each of the event types selected. For example, if the minimum reduction value is set to 10%, the telemetry processing service 110 will select a subset of the event types for which the cumulative reduction in telemetry volume is at least 10%. In some implementations, the user may also specific a maximum reduction in the overall telemetry volume, and the telemetry processing service 110 will select a subset of the event types for which the cumulative reduction in telemetry volume does not exceed the maximum reduction value. For example, if the maximum reduction value is set to 30%, the telemetry processing service 110 may select a subset of the event types for which the reduction in telemetry volume is at least 10% and does not exceed 30%.

The process 700 may include an operation 750 of obtaining second telemetry data from the subset of telemetry data sources at the reduced sampling rate associated with each event type of the subset of event types. The telemetry processing service 110 may implement the adaptive sampling on telemetry data subsequently obtained by the telemetry processing service 110. As discussed in the preceding examples, the telemetry processing service 110 may send a message instructing one or more telemetry data sources of the subset of the telemetry data sources to stop sending telemetry data associated with specific event types to reduce the volume of telemetry data according to the reduced sampling rate.

The process 700 may include an operation 760 of analyzing the second telemetry data to determine one or more estimated metric values for one or more metrics, the one or more estimated metric values representing an estimate of what the one or more metric values would have been had the second telemetry data not been sampled at the reduced sampling rate. The adaptive sampling framework 210 may be configured to analyze the second telemetry data and to determine an estimate of the actual telemetry value that would have been obtained had all the telemetry been collected and analyzed rather than the reduced volume of telemetry data collected and analyzed by the adaptive sampling.

The process 700 may include an operation 770 of generating a report comprising the one or more estimated metric values and an estimated total cost savings based on the estimated cost savings associated with each event type. As discussed in the preceding examples, the data visualization layer 215 of the telemetry processing service 110 may generate various reports that may be presented on a display of a client device 105 of a user. The reports may also be stored in a reporting database of the telemetry processing service 110 and/or sent to the computing devices of one or more users.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
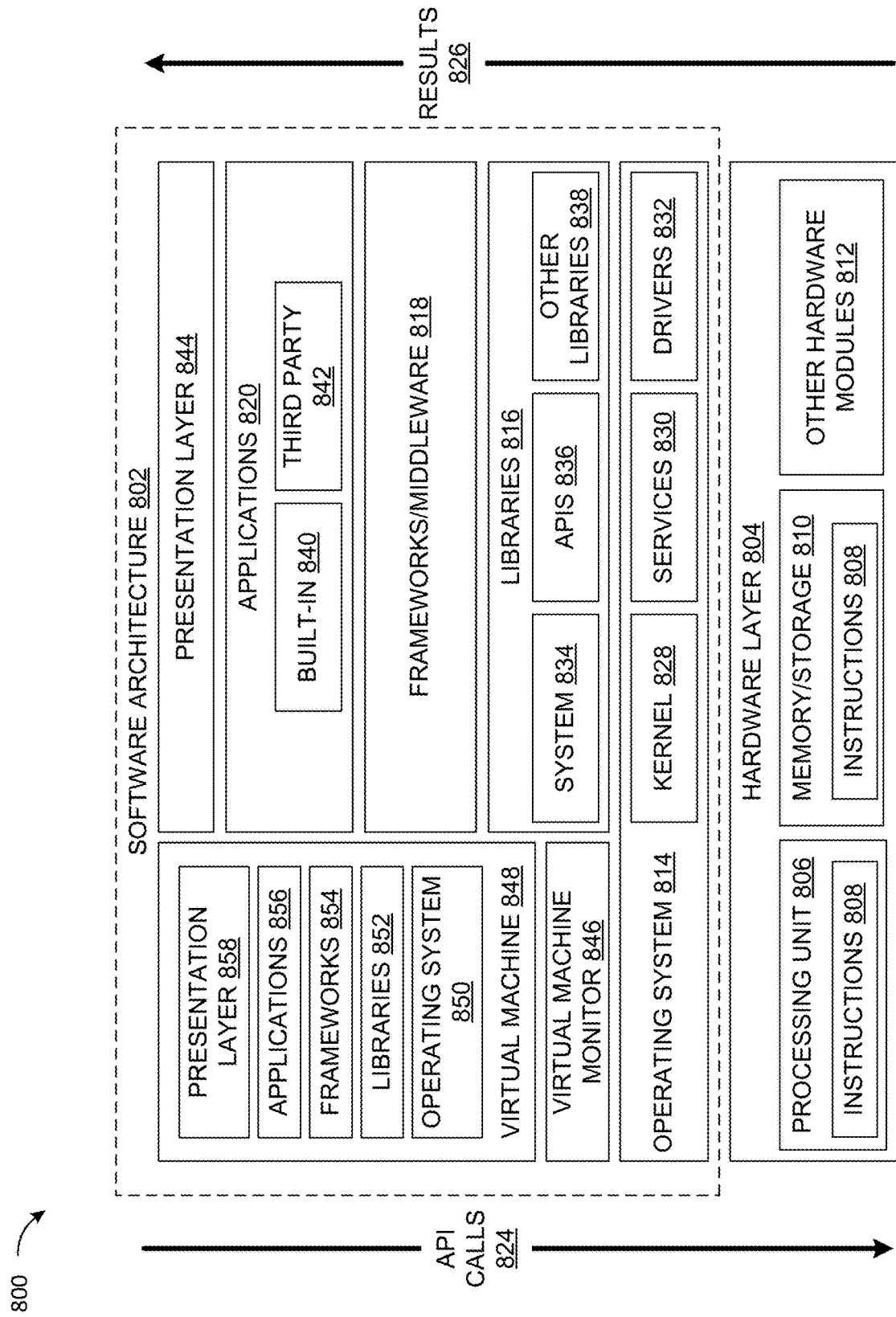
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
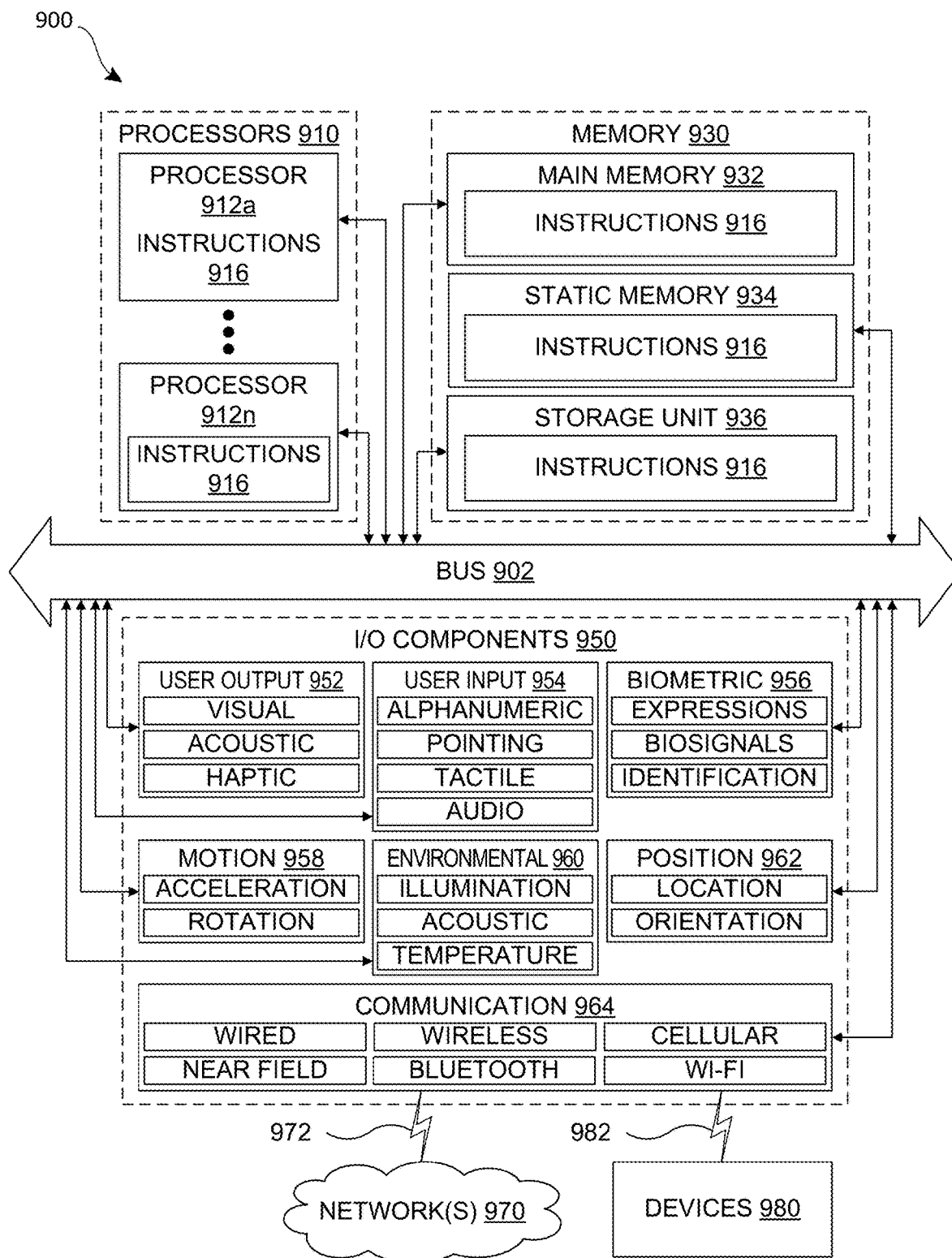
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
   obtaining first telemetry data from a plurality of telemetry data sources;
   analyzing the first telemetry data to identify a subset of telemetry data sources of the plurality of telemetry data sources for which a reduced sampling rate may be implemented, the first telemetry data being associated with a plurality of event types;
   determining a reduced sampling rate for each event type of the plurality of event types, the reduced sampling rate indicating a percentage of the subset of telemetry data sources from which telemetry data associated with that event type is to be obtained;
   selecting a subset of the event types for which the reduced sampling rate is to be applied;
   obtaining second telemetry data from the subset of telemetry data sources at the reduced sampling rate associated with each event type of the subset of event types;
   analyzing the second telemetry data to determine one or more estimated metric values for one or more metrics, the one or more estimated metric values representing an estimate of what the one or more metric values would have been had the second telemetry data not been sampled at the reduced sampling rate; and
   generating a report comprising the one or more estimated metric values and an estimated total cost saving based on an estimated cost saving associated with each event type.

2. The data processing system of claim 1, wherein analyzing the first telemetry data to identify the subset of sampling data sources further comprises:
   executing a plurality of first simulations on the first telemetry data to identify the subset of the telemetry data sources.

3. The data processing system of claim 2, wherein determining the reduced sampling rate for each event type of the plurality of event types further comprises:
   executing a plurality of second simulations on the first telemetry data to determine the reduced sampling rate for each event type of the plurality of event types.

4. The data processing system of claim 2, wherein the machine-readable medium includes instructions configured to cause the processor to perform operations of:
   receiving one or more first input parameters, each input parameter identifying an attribute of the subset of the telemetry data sources,
   wherein analyzing the first telemetry data to identify the subset of telemetry data sources includes selecting telemetry data sources from the plurality of telemetry data sources that have an attribute matching the one or more first input parameter.

5. The data processing system of claim 2, wherein the machine-readable medium includes instructions configured to cause the processor to perform operations of:
prior to obtaining the second telemetry based on the reduced sampling rate, determining that a threshold condition for obtaining the second telemetry data at the reduced sampling rate has been satisfied.

6. The data processing system of claim 5, wherein the machine-readable medium includes instructions configured to cause the processor to perform operations of:
prior to obtaining the second telemetry data, sending instructions to first plurality of telemetry data sources of the subset of the plurality of telemetry data sources to stop providing telemetry data to reduce a volume of the second telemetry data to the reduced sampling rate.

7. The data processing system of claim 5, wherein the machine-readable medium includes instructions configured to cause the processor to perform operations of:
determining that the threshold condition for obtaining the second telemetry data at the reduced sampling rate is no longer satisfied; and
sending instructions to the first plurality of telemetry data sources to resume providing telemetry data responsive to determining that the threshold condition is no longer satisfied.

8. The data processing system of claim 1, wherein selecting a subset of the event types for which the reduced sampling rate is to be applied further comprises:
selecting the subset of the event types based on a minimum savings threshold associated with each event type, a maximum error rate associated with each event type, a minimum reduction in volume of telemetry data associated with an entire subset of event types.

9. A method implemented in a data processing system for adaptive telemetry sampling, the method comprising:
obtaining first telemetry data from a plurality of telemetry data sources;
analyzing the first telemetry data to identify a subset of telemetry data sources of the plurality of telemetry data sources for which a reduced sampling rate may be implemented, the first telemetry data being associated with a plurality of event types;
determining a reduced sampling rate for each event type of the plurality of event types, the reduced sampling rate indicating a percentage of the subset of telemetry data sources from which telemetry data associated with that event type is to be obtained;
selecting a subset of the event types for which the reduced sampling rate is to be applied;
obtaining second telemetry data from the subset of telemetry data sources at the reduced sampling rate associated with each event type of the subset of event types;
analyzing the second telemetry data to determine one or more estimated metric values for one or more metrics, the one or more estimated metric values representing an estimate of what the one or more metric values would have been had the second telemetry data not been sampled at the reduced sampling rate; and
generating a report comprising the one or more estimated metric values and an estimated total cost saving based on an estimated cost saving associated with each event type.

10. The method of claim 9, wherein analyzing the first telemetry data to identify the subset of sampling data sources further comprises:
executing a plurality of first simulations on the first telemetry data to identify the subset of the telemetry data sources.

11. The method of claim 10, wherein determining the reduced sampling rate for each event type of the plurality of event types further comprises:
executing a plurality of second simulations on the first telemetry data to determine the reduced sampling rate for each event type of the plurality of event types.

12. The method of claim 10, further comprising:
receiving one or more first input parameters, each input parameter identifying an attribute of the subset of the telemetry data sources,
wherein analyzing the first telemetry data to identify the subset of telemetry data sources includes selecting telemetry data sources from the plurality of telemetry data sources that have an attribute matching the one or more first input parameter.

13. The method of claim 10, further comprising:
prior to obtaining the second telemetry based on the reduced sampling rate, determining that a threshold condition for obtaining the second telemetry data at the reduced sampling rate has been satisfied.

14. The method of claim 13, further comprising:
prior to obtaining the second telemetry data, sending instructions to first plurality of telemetry data sources of the subset of the plurality of telemetry data sources to stop providing telemetry data to reduce a volume of the second telemetry data to the reduced sampling rate.

15. The method of claim 13, further comprising:
determining that the threshold condition for obtaining the second telemetry data at the reduced sampling rate is no longer satisfied; and
sending instructions to the first plurality of telemetry data sources to resume providing telemetry data responsive to determining that the threshold condition is no longer satisfied.

16. The method of claim 9, wherein selecting a subset of the event types for which the reduced sampling rate is to be applied further comprises:
selecting the subset of the event types based on a minimum savings threshold associated with each event type, a maximum error rate associated with each event type, a minimum reduction in volume of telemetry data associated with an entire subset of event types.

17. A machine-readable medium on which are stored instructions that, when executed, cause a processor of a programmable device to perform operations of:
obtaining a set of first input parameters associated with a first update to be deployed to one or more components of a cloud-based service;
obtaining first telemetry data from a plurality of telemetry data sources;
analyzing the first telemetry data to identify a subset of telemetry data sources of the plurality of telemetry data sources for which a reduced sampling rate may be implemented, the first telemetry data being associated with a plurality of event types;
determining a reduced sampling rate for each event type of the plurality of event types, the reduced sampling rate indicating a percentage of the subset of telemetry data sources from which telemetry data associated with that event type is to be obtained;

selecting a subset of the event types for which the reduced sampling rate is to be applied;

obtaining second telemetry data from the subset of telemetry data sources at the reduced sampling rate associated with each event type of the subset of event types;

analyzing the second telemetry data to determine one or more estimated metric values for one or more metrics, the one or more estimated metric values representing an estimate of what the one or more metric values would have been had the second telemetry data not been sampled at the reduced sampling rate; and generating a report comprising the one or more estimated metric values and an estimated total cost saving based on an estimated cost saving associated with each event type.

18. The machine-readable medium of claim 17, wherein analyzing the first telemetry data to identify the subset of sampling data sources further comprises:

executing a plurality of first simulations on the first telemetry data to identify the subset of the telemetry data sources.

19. The machine-readable medium of claim 18, wherein determining the reduced sampling rate for each event type of the plurality of event types further comprises:

executing a plurality of second simulations on the first telemetry data to determine the reduced sampling rate for each event type of the plurality of event types.

20. The machine-readable medium of claim 18, further comprising instructions configured to cause the processor to perform operations of:

receiving one or more first input parameters, each input parameter identifying an attribute of the subset of the telemetry data sources, and wherein analyzing the first telemetry data to identify the subset of telemetry data sources includes selecting telemetry data sources from the plurality of telemetry data sources that have an attribute matching the one or more first input parameter.

* * * * *